(12) United States Patent
Patterson et al.

(10) Patent No.: US 7,171,531 B2
(45) Date of Patent: Jan. 30, 2007

(54) PROCESS JOB FLOW ANALYSIS

(75) Inventors: Brian L. Patterson, Boise, ID (US);
Marc E. LeFevre, Boise, ID (US);
Randy J. Matthews, Boise, ID (US);
Rodger D. Daniels, Boise, ID (US);
Brian S. Bearden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 10/759,772

(22) Filed: Jan. 14, 2004

(65) Prior Publication Data
US 2005/0154827 A1    Jul. 14, 2005

(51) Int. Cl.
*G06F 12/00*    (2006.01)

(52) U.S. Cl. .................. 711/163; 711/112; 710/260

(58) Field of Classification Search ............... 711/154, 711/112, 114, 163; 710/260, 265, 18, 3
See application file for complete search history.

(56) References Cited

U.S. PATENT DOCUMENTS

| | | | | |
|---|---|---|---|---|
| 5,166,927 A | * | 11/1992 | Iida et al. .................. | 370/238 |
| 5,459,866 A | * | 10/1995 | Akiba et al. ............... | 717/144 |
| 5,805,883 A | * | 9/1998 | Saitoh ....................... | 710/260 |
| 5,974,502 A | * | 10/1999 | DeKoning et al. .......... | 711/114 |
| 6,157,977 A | * | 12/2000 | Sherlock et al. ............ | 710/310 |
| 6,578,096 B1 | * | 6/2003 | Steinmetz et al. .......... | 710/105 |

* cited by examiner

*Primary Examiner*—Pierre-Michel Bataille (57) ABSTRACT

A storage device is configured with one or more processes that receive, process, and pass on jobs from a source. The number of jobs received by a process is compared with the number of jobs completed and/or passed on by the process. If the number of jobs that are received is disproportionate to the number of jobs completed and/or passed on by the process, a hang may exist and a corrective action, such as resetting, may be performed along with a request for all or some of the jobs to be resent.

26 Claims, 6 Drawing Sheets

PROCESS JOB FLOW ANALYSIS

BACKGROUND

Disk array data storage devices (i.e., mass storage systems) are configured with multiple storage disk drives arranged and coordinated to form a single mass storage system or device. Three primary design criteria for disk array storage devices include cost, performance, and availability. It is most desirable to produce disk array storage devices that have a low cost per megabyte, a high input/output performance, and high data availability. Data availability is the ability to access data stored in a disk array data storage device and the ability to insure continued operation in the event of some failure.

Disk array data storage devices may be part of a larger local area network, storage area network or other network. The larger network may be configured as a fibre-channel arbitrated loop, a serial network, and/or one of various defined hardware networks. Host computers or controllers (hosts) may be part of the larger network and provide data to be stored to and retrieved from the disk array data storage device. Data availability is particularly directed to hosts being able to access data and interface with a disk array storage device on the network.

Redundant arrays of independent/inexpensive disks (RAID) are particular disk array storage devices intended to provide better performance and reliability than storage devices comprised of single disks. A RAID storage device includes an array of disks arranged to support a particular RAID level of redundancy, where data for the RAID storage device is stored in one or more disks.

Typically, data availability is provided through the use of redundancy wherein data, or relationships among data, are stored in multiple locations or disks. RAID redundancy and data storage is commonly defined by the term "striping". Two common methods of storing redundant data or striping are the "mirror" and "parity" methods. Furthermore, there are variations of particular striping methods.

A RAID storage device includes an array controller which provides an interface to the array of disks and to the larger network described above which is made up of devices such as a host computer. The array controller may be configured as hardware, firmware, and/or software. In particular, logical sections of the array controller may be configured through hardware, firmware, and/or software to perform particular functions.

Typically, the functions of logical sections of the array controller are performed serially. In other words, a logical section of the array controller receives a job; performs functions or processes the job; and passes on processed and/or unprocessed portions of the job to a succeeding logical section(s) or an output of the array controller.

One major hindrance to providing consistent reliability to properly process and pass on jobs is the tendency for the array controller to occasionally "hang". A hang is seen when the RAID storage device, in particular the array controller, becomes unresponsive to one or more of the types of tasks that the RAID storage device or array controller is supposed to be capable of doing. For example, a host computer (host) or other device in the network sends jobs to or attempts to access jobs from the RAID storage device and the RAID storage device is unresponsive. For this particular hang, the RAID storage device receives host inputs (or other device input) and simply never responds to them, despite the RAID storage device being otherwise idle. Hangs can be caused by numerous situations including, but not limited to, process threads that have been dropped (e.g., failure to process to completion) or deadlock scenarios.

A characteristic of hangs is that they are not inherently self correcting. In certain events, what may appear to a host (i.e., user) to be a hang actually is not a hang, but relatively long periods of non-responsiveness from a RAID storage device. In other words, the RAID storage device may be non-responsive for a period of time but then spontaneously recovers by itself. That particular RAID storage device was not hung. In this case, the RAID storage device merely had an unusually long response time for a subset of the jobs that were given to it.

Given the characteristics of non-responsiveness of a RAID storage device to certain inputs and the inability of the RAID storage device to correct hang conditions by itself, a hang will continue until some external corrective action is taken. A corrective action may involve a service call or performing maintenance to fix the hang. In particular instances, the corrective action is resetting a component in the RAID storage device, while the rest of the RAID storage device remains active. In certain hang cases, all that may be needed is a simple reset of the RAID storage device. Until the hang situation is resolved (e.g., the corrective action performed), activity on the network, and in particular the host computer or other device that is sending and/or requesting, may be stopped for extended periods of time resulting in high costs and lost productivity.

SUMMARY

A storage device is configured with one or more processes that receive, process, and pass on jobs from a source. The number of jobs received by a process is compared with the number of jobs completed and/or passed on by the process. If the number of jobs that are received is disproportionate to the number of jobs completed and/or passed on by the process, a hang may exist and a corrective action, such as resetting, may be performed along with a request for all or some of the jobs to be resent.

BRIEF DESCRIPTION OF THE DRAWINGS

The following detailed description refers to the accompanying figures. In the figures, the left-most digit(s) of a reference number identifies the figure (FIG.) in which the reference number first appears. Moreover, the same reference numbers are used throughout the drawings to reference like features and components.

DETAILED DESCRIPTION

Overview

The following discussion is directed to systems and methods for storage devices that analyze the amount of jobs that are received, processed, passed on, and outputted by processes that control passing and receiving jobs to the storage devices. If a determination is made that a particular number of jobs are not processed or output in an acceptable amount of time or at an acceptable rate a hang is detected and a storage device performs a corrective action. A reset of the storage device is one of numerous corrective actions that may be taken. Although storage devices are particularly discussed as an example, other devices and serial processes may make use of the described methods.

Exemplary System

Figure 1:
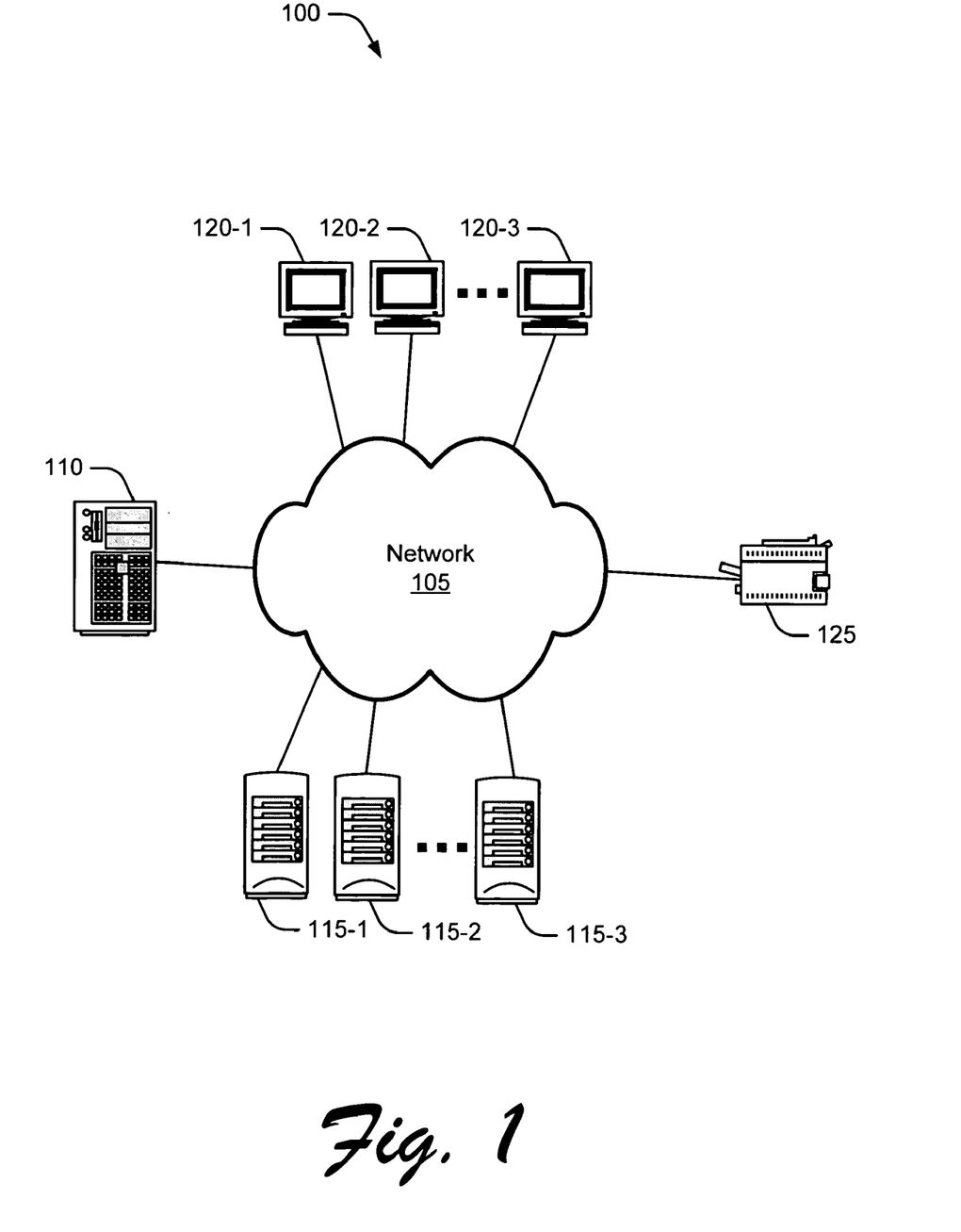
FIG. 1 is a block diagram illustrating an embodiment of an exemplary system that incorporates multiple devices including self correcting RAID storage devices.

FIG. 1 shows a system 100 that includes self-correcting storage devices. System 100 includes a network 105 that connects various devices to communicate with one another. Network 105 may include other networks such as various local area networks (LAN), wide area networks (WAN), and storage area networks (SAN). Furthermore, network 105 may be comprised of wired and wireless connections, along with various interfaces.

A host computer 110 is shown as part of system 100 and connected to network 105. Host computer 110 provides various jobs to and accesses completed jobs from one or more self-correcting storage devices 115-1, 115-2 . . . , 115-3. Jobs may include commands, data, and/or instructions. Storage devices 115 are configured to detect and perform a corrective action when one of storage device 115 experiences a situation indicative of a hang. An example of corrective action is a reset of one the storage devices 115 or a component included in one of storage devices 115.

System 100 further includes one or more work stations 120-1, 120-2 . . . , 120-N connected to network 105. Work stations 120 may also provide various jobs to and receive completed jobs from self-correcting storage devices 115. System 100 further includes other miscellaneous devices such as a printer 125 that may provide jobs to and access completed jobs from self-correcting storage devices 115.

Self-correcting storage devices 115 are configured to perform corrective action when a situation is encountered indicative of a hang. Corrective action may be a reset of an array controller of a particular self-correcting RAID storage device 115.

Exemplary Self-correcting Storage Device

Figure 2:
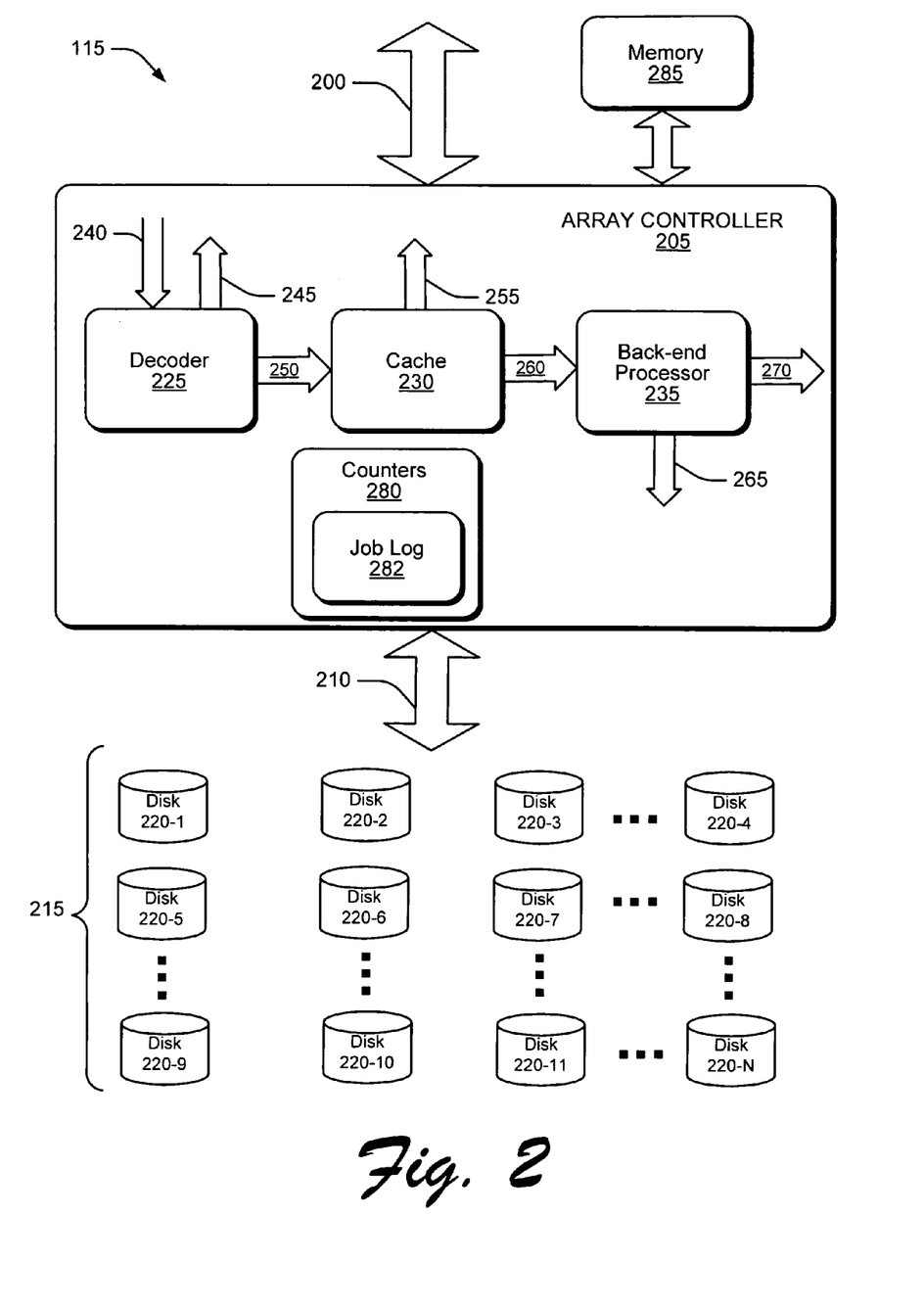
FIG. 2 is a block diagram illustrating an embodiment of an exemplary storage device configured for corrective action when a hang is experienced.

FIG. 2 shows an exemplary self-correcting storage device 115. In this example, the storage device is a redundant array of independent disk (RAID) storage device. Self-correcting RAID storage device 115 receives and outputs jobs through an interface 200 to network 105 of FIG. 1. Self-correcting RAID storage device 115 includes an array controller 205. An interface 210 provides communication between array controller 205 and an array of disks 215 comprised of disks 220-1 to 220-N. Disks 220 may be arranged in any particular RAID level of redundancy or striping.

The array controller 205 includes, but is not limited to, logical sections or components that comprise a decoder 225, a cache 230, and a back-end processor 235. Decoder 225, cache 230, and back-end processor 235 may be configured as software, firmware, hardware, or a combination.

Jobs from an input/output 240 are received by decoder 225. Input/output 240 may be seen as an output of interface 200, or as an input to decoder 225. Jobs to input/output 240 are directly received from interface 200, wherein the jobs to input/output 240 include jobs from hosts, work stations, and other devices of a system that self-correcting RAID device 115 is a part of. Jobs to input/output 240 include jobs that are either completed or passed on by decoder 225.

An example of a job received and completed by decoder 225 is a "test-unit-ready" command sent from a host (or other device) that queries the self-correcting RAID storage device 115 to determine if it is alive (active). Decoder 225 completes the "test-unit-ready" command and sends a reply back through input/output 245 back through interface 200 which is sent to the host (or other device) which initiated the job to the self-correcting RAID storage device 115. In this example, disk array 215 and/or disks 220 do not receive jobs directly from decoder 225 and input/output 245.

Decoder 225 may not complete all the jobs it receives and acts as a conduit to pass on received jobs from a host or other device. Non-completed jobs are subsequently completed by cache 230, back-end processor 235, or disks 220. The non-completed jobs from decoder 225 are passed via input/output 250 to cache 230. Input/output 250 may be seen as an output of decoder 225, or as an input to cache 230.

Input/output 250 represents jobs that the decoder 225 cannot complete on its own or passes on for further completion by a subsequent logical section or a disk in disk array 215 (i.e., cache 230, back-end processor 235, and/or disks 220). A "data read" or "data write" command is an example of a job that is passed on from the decoder 225 to the cache 230 via input/output 250. The decoder 225 passes on the "data read" or "data write" command that allows the cache 230 or back-end processor 235 to perform the "data read" and/or "data write" command.

Input/output 255 represents jobs that the cache 230 can complete without passing on to the back-end processor 235. An example of a job that the cache 230 is able to complete includes reading data resident on the cache 230. The cache 230 reads the resident data without passing a command to the back-end processor 235. Completed jobs (e.g., the read resident data on cache 230) from cache 230 are sent from input/output 255 back to the host (or other device) via interface 200. In this example, disk array 215 and/or disks 220 do not receive jobs directly from cache 230 and input/output 255.

Input/output 260 represents jobs that the cache 230 passes on to the back-end processor 235. In particular, input/output 260 represents jobs that the cache 230 cannot complete without the use of the back-end processor 235. An example of such a job includes a "data read" command wherein data is not in the cache 230. In order to perform the "data read" command, the job (i.e., request) is sent or passed on by the cache 230 to the back-end processor 235.

Input/output 265 represents jobs that the back-end processor 235 completes without accessing the disk array 215 or disks 220. An example of such a job is a read command of particular data missing on the disk or disks 220. Such read command is an error path recognition command. The back-end processor 235 knowing the location on the disks 220 that is trying to read is not available returns an error message which is sent back to the host (or other device) via input/output 265. In this example of self-correcting RAID storage device 115, disk array 215 and/or disks 220 do not receive jobs directly from input/output 265.

Input/output 270 represents jobs that the back-end processor 235 passes on to the disks 220 or command(s) used to read the disks 220. Input/output 270 is directly connected to interface 210.

In this example, input/outputs 240, 245, 250, 255, 260, 265, and 270 are described. The input/outputs represent jobs that are sent, processed, or passed on. Counters 280 are a set of logical sections or dedicated counters that account for jobs that are sent, completed, and passed on though each input/output. Dedicated counters of counters 280 track the number of jobs (i.e., the number of commands and data) received and sent though each input/output. In other words, counters 280 include a counter for each input/output tracking the number of jobs received/sent by each input/output. Furthermore, counters in counters 280 may be configured to determine the rate which jobs are received/sent at each input/output. In particular embodiments, counters 280 may include job logs 282 which track and record the particular jobs seen at each counter.

A hang in the array controller may exist if the amount of jobs received by a particular logical section is disproportionate to the amount of jobs the particular logical section completes and/or passes on. Proportionality of received, completed, and passed jobs is determined by counters 280 by calculating and determining rates for the jobs that are received, completed, and passed, then comparing the determined rates with expected rates of received, processed, and passed jobs. If the determined and expected rates are inconsistent, a hang may exist, and corrective action is performed on the array controller 205. However, there can be conditions that would stop transitions from one process to the next that are not hangs. An example of such a non-hang condition is the removal of all of the disks 215 from the self-correcting RAID storage device 115. In this condition, jobs are not able to transition from the logical sections of array controller 205.

Inconsistencies in job input and job output at a process may be seen when a relatively large amount of jobs are sent to a logical section, while the logical section completes and/or passes on a disproportionate (i.e., lower rate) amount of jobs. In other words, there are more jobs being received than jobs being processed and/or passed on. Such conditions may be indicative of a hang, and the corrective action may be a reset which clears all commands and initiates a new request for jobs to be resent from the host/source (or other device) in the system that sent the original jobs. Analyzing job flow is further described below in exemplary serial processes. If a job log 282 is implemented for each counter in counters 280, particular job logs can be looked at to determine what job was at an input/output when the suspected hang was seen and corrective action performed. The identified job may be what is causing the hang, especially if the job is seen again when a hang reoccurs.

Array controller 205 may be considered as a processor, and self-correcting RAID storage device 115 may be implemented with one or more memory components shown as memory 285 which are processor-readable medium (i.e., may be read by array controller 205). Examples of memory 285 include a random access memory (RAM), a disc storage device, and non-volatile memory (e.g., any one or more of a read-only memory (ROM), flash memory, EPROM, EEPROM, etc.). Memory 285 may include any type of magnetic or optical storage device, such as a hard disc drive, a magnetic tape, a recordable and/or rewriteable compact disc (CD), a DVD, DVD+RW, and the like. The one or more memory components provide data storage mechanisms to store various information and/or data such as configuration information for self-correcting RAID storage device 115, and particular array controller 205.

Exemplary Processes

Figure 3:
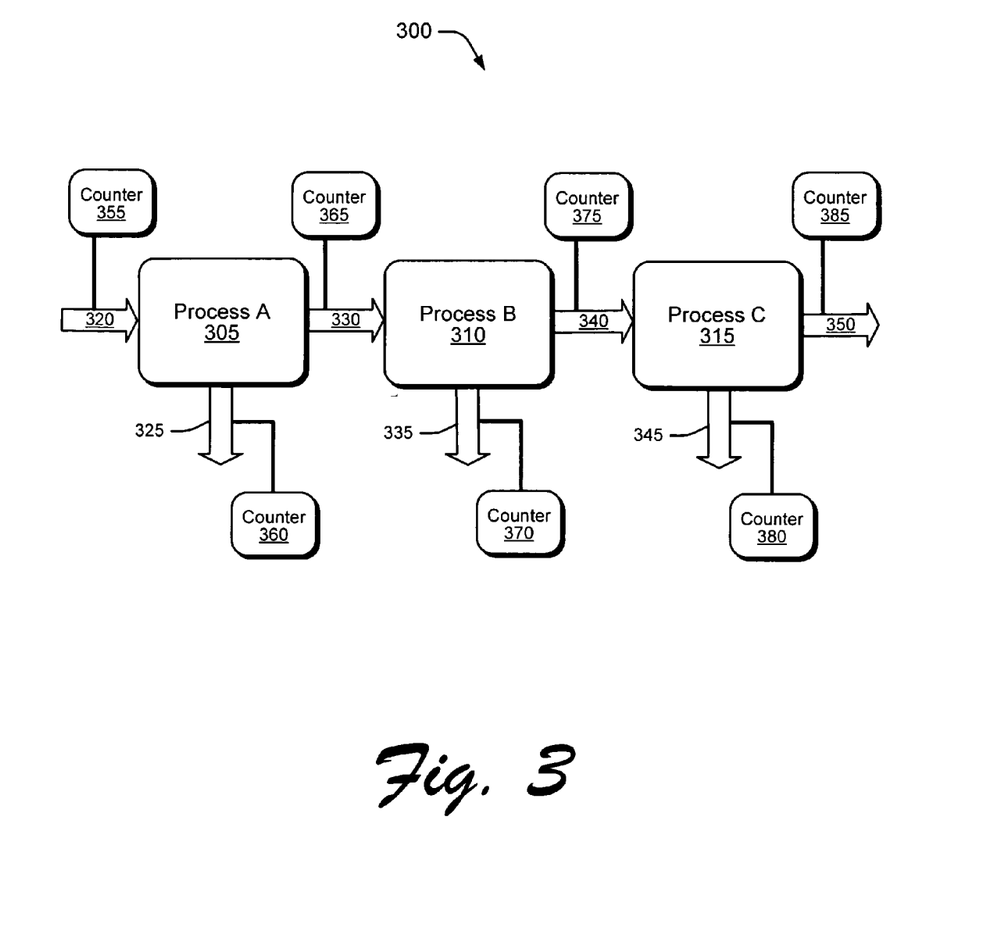
FIG. 3 is a block diagram illustrating an embodiment of a series of processes that serially receive, complete, and pass on jobs sent from a source.

FIG. 3 illustrates a series of processes 300 that receives, processes (i.e., completes), and passes on jobs. Jobs comprised of commands, data, and instructions are sent from a source to processes 300. In this example, processes 300 include a series of process A 305, a process B 310, and a process C 315.

Processes 300 may represent the logical sections of array controller 205 of FIG. 2. In particular, process A 305 may be associated with decoder 225, process B 310 may be associated with cache 230, and process C 315 may be associated with back-end processor 235.

A process of processes 300 receives a job(s) either from the source; completes the job(s) which is sent back to the source and/or other destinations; and may serially pass on uncompleted jobs to a succeeding process. Job flow of each process 305, 310, and 315 may be described by jobs received (i.e., an input of jobs); jobs completed (i.e., an output of jobs); and jobs passed on (i.e., another output of jobs). In general, jobs that are received (i.e., input of jobs) equals the number of jobs completed and/or passed on (i.e., output of jobs or a sum of the jobs completed and jobs passed on). If the number of jobs received at a process over a particular time is greater than the number of jobs completed and/or passed on at the same time, it may be indicative of a problem (i.e., a hang) and corrective action may be performed. However, as discussed above, job flow may be affected by non-hang situations which a user should be aware of (e.g., the removal of a disk array from a raid storage device).

An output of a process may be an input to succeeding process, the source, or other destination. Furthermore, an input to a process may be an output from a preceding process or the source. Therefore at each process is an input/output interface (input/output) which may be viewed as a input or output. Shown in this example are input/outputs 320, 325, 330, 335, 340, 345, and 350 are described. As discussed above, input/outputs may be seen as inputs or outputs to a particular process. For process A 305, input/output 320 is seen as jobs input, input/output 325 is seen as jobs completed output, and input/output 330 is seen as jobs passed on output. For process B 310, input/output 330 is seen as jobs input, input/output 335 is seen as jobs completed output, and input/output 340 is seen jobs passed on output. For process C 315, input/output 340 is seen as jobs input, input/output 345 is seen as jobs completed output, and input/output 350 is seen as jobs passed on output.

A job flow analysis device such as a counter is assigned to each input/output. Counters are configured to track the number of jobs sent to processes 300. As discussed above in FIG. 2, counters may also include job logs that record jobs for each input/output. Counters are assigned to look at jobs that are received or sent to process A 305, process B 310, and process C 315. In this example counter 355 tracks input/output 320; counter 360 tracks input/output 325; counter 365 tracks input/output 330; counter 370 tracks input/output 335; counter 375 tracks input/output 340; counter 380 tracks input/output 345; and counter 385 tracks input/output 350.

In alternate embodiments, counters may be replaced with bandwidth analysis applied to input/outputs to determine bandwidth consumption of particular jobs sent to the logical sections. Bandwidth analysis may include recording the time that particular jobs take to complete. In the example of self-correcting RAID storage device 115 of FIG. 2, bandwidth analysis may be performed by the array controller 205 which particular looks at job flow at input/outputs 240, 245, 250, 255, 260, 265, and 270.

Generally over time, the amount of jobs that go into a process (i.e., process A 305, process B 310, and process C 315) equals the amount of jobs that are processed and/or passed on by the process. Processes 300 is treated as one process with jobs received input input/output 320, and jobs processed/passed on output input/outputs 325, 335, 345, and 350. Overall it is expected that jobs that are sent to processes 300 will be completed (i.e., processed and/or passed on) over an expected time period. Therefore, if over the expected time period, the number of jobs sent to processes 300 exceeds the number of jobs that processes 300 complete (i.e., processes and/or passes on), a discrepancy may exist in processes 300 or within one or more of the individual process A 305, B 310, and C 315. Corrective action, such as a reset in array controller 215 of self-correcting RAID storage device 215 may take place when a discrepancy in job flow is detected.

Process A 305, process B 310, and process C 315 may be comprised of sub-processes having particular inputs and outputs wherein jobs are received, processed, and/or passed on. Such sub-processes may have inputs and outputs that are looped and/or branched; however, such sub-processes may be grouped to describe a single process having an input for jobs, and outputs for jobs completed and jobs passed on.

Figure 4:
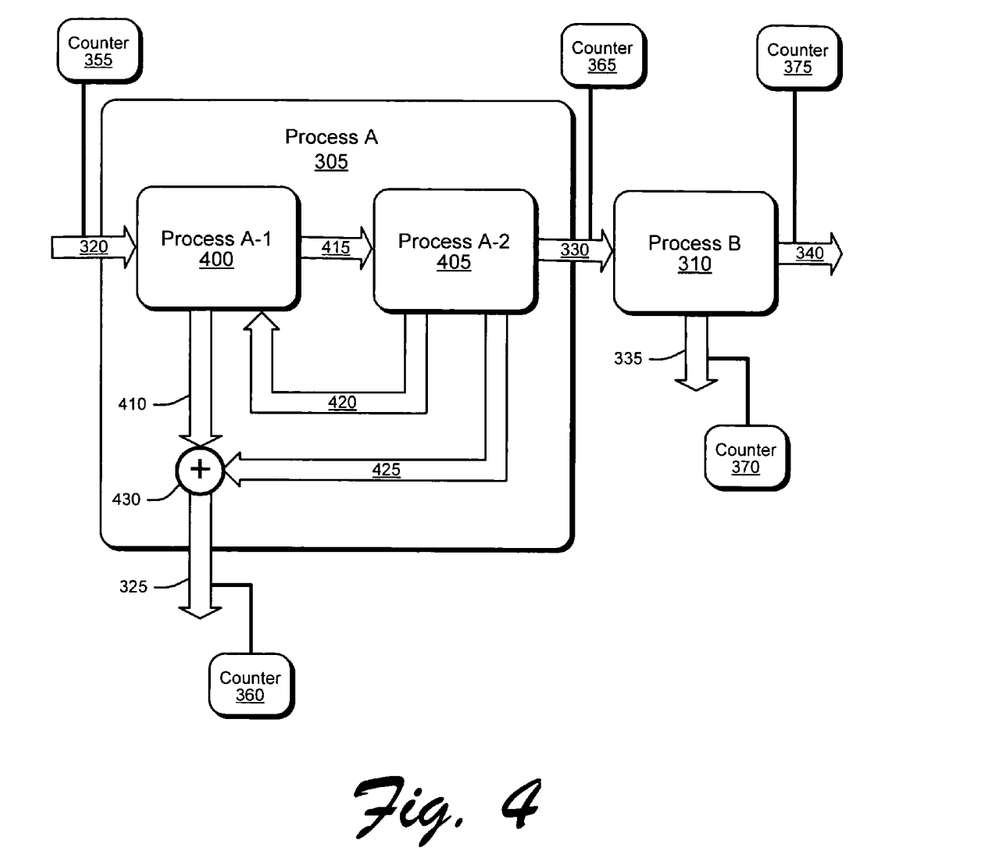
FIG. 4 is a block diagram illustrating looping sub-processes of serial processes that receive, complete, and pass on jobs sent from a source.

FIG. 4 illustrates looping sub-processes in a process configured to receive, process, and/or pass on jobs. In this example process A 305 is further described by a sub-process A-1 400 and a sub-process A-2 405. Process A-1 400 receives jobs from input/output 320, processes jobs as output to input/output 410, and passes jobs as output to input/output 415. Furthermore, jobs are passed to (input) to process A-1 400 through input/output 420 from process A-2 405. Process A-2 405 receives jobs from process A-1 400 through input/output 415. Process A-2 405 processes jobs that are sent out via input/outputs 420 and 425. Jobs that are to be further completed by process A-1 400 is sent to or "looped back" to process A-1 400 through input/output 420. Completed jobs that do not need to be processed by process A-1 400 are sent as output through input/output 425. All jobs to be passed (i.e., not processed) by process A 305 are passed from process A-2 405 through input/output 330.

Jobs that are completed by process A 305 are comprised of jobs that are completed by process A-1 400 and process A-2 405. Jobs completed from input/output 410 are summed together with the jobs completed from input/output 425 by a summer 430 and output as completed jobs through input/output 325. In this example, counters 355, 360, and 365 track jobs sent to, processed by, and passed by process A 305; however, it is contemplated that counters may also be implemented in tracking jobs sent to, processed by, and passed by processes A-1 400 and A-2 405.

Figure 5:
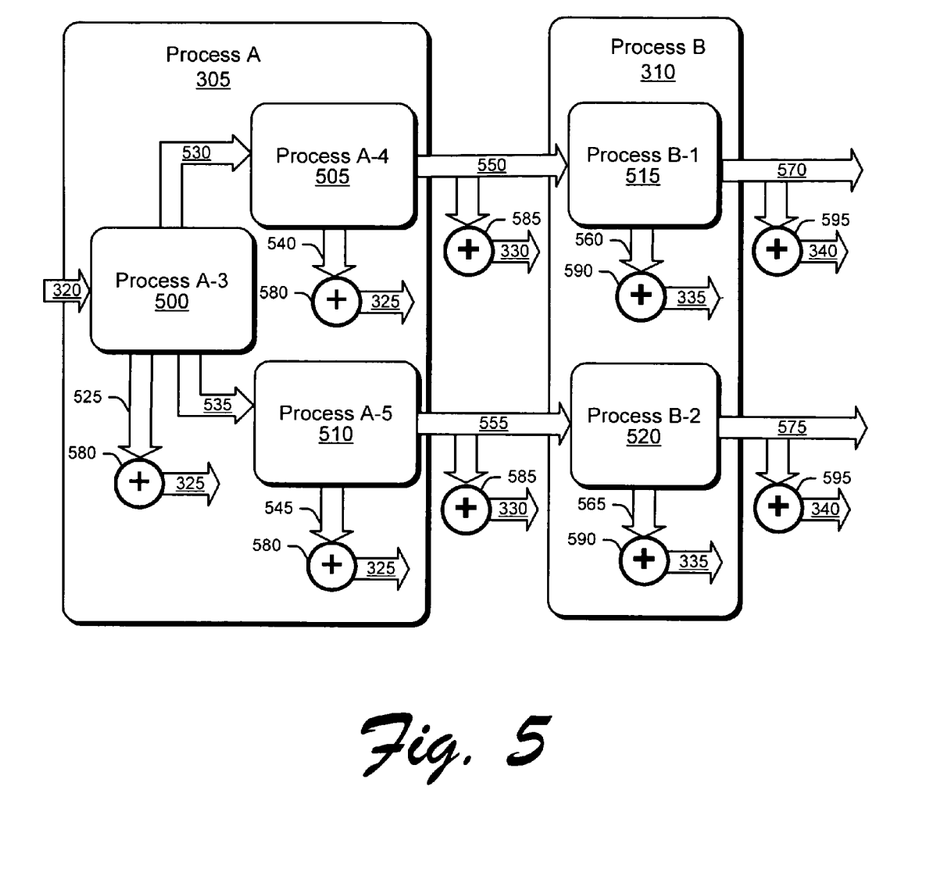
FIG. 5 is a block diagram illustrating an embodiment of branching sub-processes of serial processes that receive, complete, and pass on jobs sent from a source.

FIG. 5 illustrates branching sub-processes in a process configured to receive, process, and/or pass on jobs. In certain situations, a process may be comprised of sub-processes that branch from other sub-processes. Like the looping sub-processes, process A-1 400 and process A-2 405, described in FIG. 4, branching sub-processes may be combined to form a generalized process as described in FIG. 3.

In this example, process A 305 is comprised of branching sub-processes, specifically process A-3 500, process A-4 505, and process A-5 510. Process B 310 is also comprised of branching sub-processes, specifically process B-1 515 and process B-2 520.

Process A-3 500 receives jobs from input/output 320, completes jobs as output to an input/output 525, and passes jobs as output to input/outputs 530 and 535. The jobs passed through input/output 530 are branched to and specifically sent to process A-4 505. Similarly the jobs passed through input/output 535 are branched to and specifically sent to process A-5 510. In this example, process A-4 505 completes jobs that are output to input/output 540 and passes jobs as output to input/output 550. The process A-5 510 completes jobs that is output to input/output 545, and passes jobs as output to input/output 555. The process B-1 515 receives jobs as input from input/output 550, completes jobs that are output to input/output 560, and passes jobs as output to input/output 570. The process B-2 520 receives jobs as input from input/output 555, completes jobs that are output as input/output 565, and passes jobs as output to input/output 575.

Jobs that are completed by process A 305 are represented as the sum of the job output from input/outputs 525, 540, and 545, or the sum of the jobs completed by the individual processes A-3 500, A-4 505, and A-5 510. A summer 380 adds the output from input/outputs 525, 540, and 545 as an output as completed jobs through input/output 325. As described in FIGS. 3 and 4 a counter may be used to track the jobs that are seen at input/output 325.

Jobs that are passed on from process A 305 to process B 310 are represented as the sum of the jobs passed from input/output 550 and 555, or the sum of the jobs passed by the individual processes A-4 505 and A-5 510. A summer 585 adds the output from input/outputs 550 and 555 as an output of passed jobs through input/output 330. As described in FIGS. 3 and 4 a counter may be used to track the jobs that are seen at input/output 330.

Jobs completed by process B 310 are represented by the sum of the jobs output from input/outputs 560 and 565, or the sum of the jobs completed by the individual processes B-1 515 and B-2 520. A summer 590 adds the outputs from input/outputs 560 and 565 which are sent as completed jobs through input/output 335. As described in FIGS. 3 and 4 a counter may be used to track the jobs that are seen at input/output 335.

Jobs that are passed on from process B 310 to a succeeding process or as output back to the job originating source is represented as the sum of the jobs passed from input/output 570 and 575, or the sum of the jobs passed by the individual processes B-1 515 and B-2 520. A summer 595 adds the output from input/outputs 570 and 575 as an output of passed jobs through input/output 340. As described in FIGS. 3 and 4 a counter may be used to track the jobs that are seen at input/output 340.

FIGS. 4 and 5 illustrate that looping and branching processes (sub-processes) may be described in general by a process shown in FIG. 3. Specifically, processes or sub-processes may be grouped so that an input of jobs, an output of completed jobs, and an output of passed jobs are described by process A 305, process B 310, and process C 315. Generally, jobs received (input) equals the amount of jobs completed and/or passed on over a given time. If an inequality exists (i.e., input does not equal output), it may be indicative of a problem and corrective action may be required. As discussed above, for a storage device such as self-correcting RAID storage device 115 that receives a job from a source, the corrective action may be a reset and initiating a re-request for the job from the source, or completing the current job and requesting from the source for all jobs that have yet to be completed.

Job Flow Analysis

Figure 6:
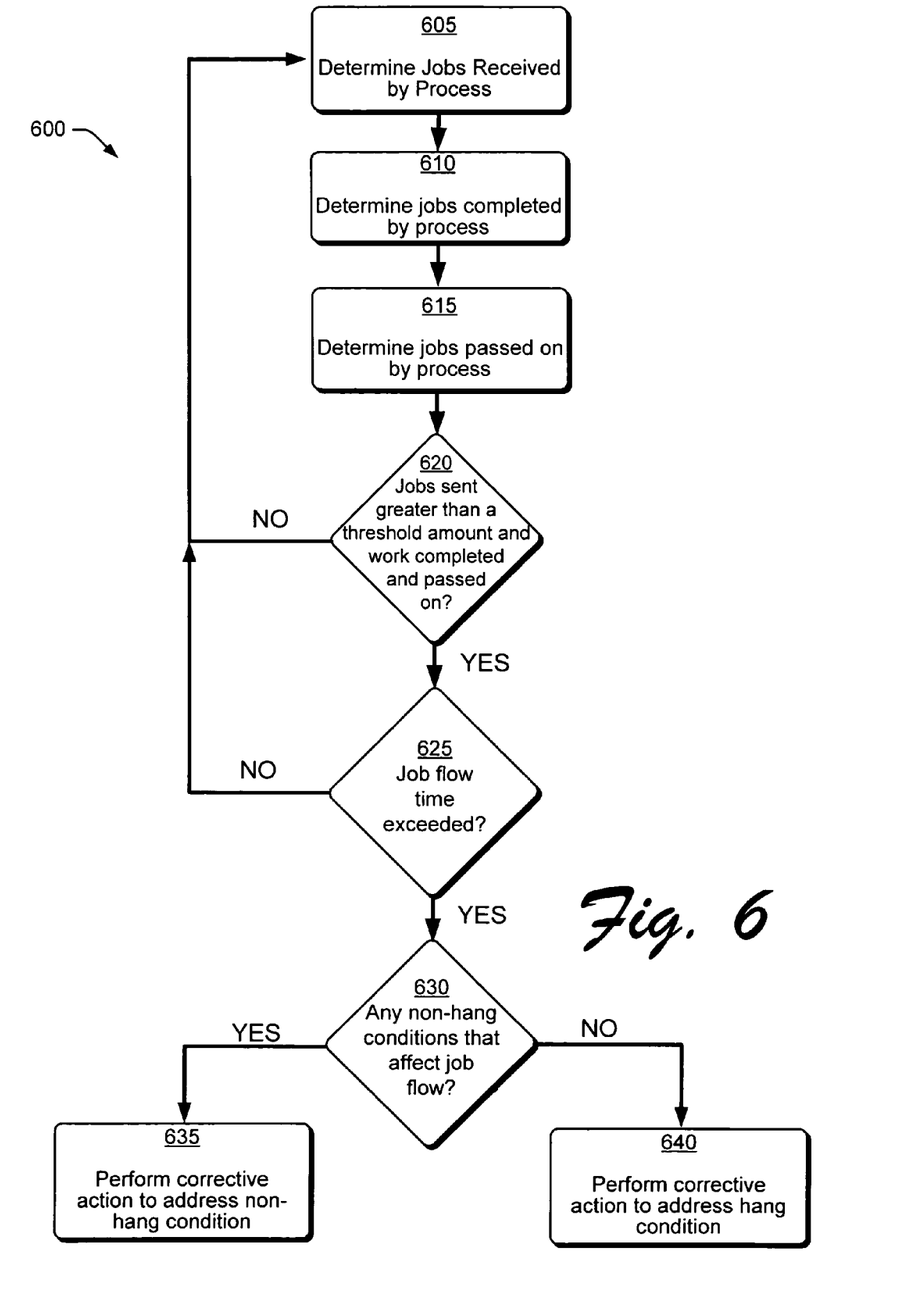
FIG. 6 is a flowchart illustrating an embodiment of job flow analysis at a process and performing corrective action when a discrepancy is determined.

FIG. 6 illustrates an exemplary procedure 600 for analyzing job flow at a process. Procedure 600 may be included in logical sections or components of a storage device such as a RAID storage device. In particular procedure 600 may be included in the logical sections or components 225, 230, and 235 of FIG. 2, where such components include means for performing the steps or blocks of procedure 600. In general, procedure 600 may be included in the individual processes 305, 310, and 315 of FIG. 3 to analyze job flow at each process.

As discussed in FIGS. 4 and 5, processes or sub-processes may be grouped into a process (i.e. processes described in FIG. 3) that describes jobs received, jobs completed, and job passed. A process that receives jobs, but is neither completing nor passing on jobs may have problem (i.e., a hang) and corrective action may be needed. However, as discussed, certain situations such as when disks are removed prevent job flow. Users should be aware of such conditions which prevent job flow that may be interpreted as hang conditions.

At block 605, a determination is made as to jobs that are received by a process. For example, jobs received by a process are shown by input/output 320 to process A 305, input/output 330 to process B 310, and input/output 340 to process C 315 of FIG. 3. Jobs may be defined as discrete or defined units such as commands, data, and instructions. The jobs are either completed or passed on to a succeeding process, originating source, and/or other destination such as the disks 220 described in FIG. 2. The jobs received by the process are treated as jobs awaiting an action (i.e., to be completed or passed on) to be performed by the process. Determination at block 605 may include counting the number of jobs that are received or determining a rate of the number of jobs received where the rate is based on a common time period. Counters 355, 365, and 375 of FIG. 3 show counting of jobs received.

At block 610, a determination is made as to jobs completed by the process. For example, completed jobs by a process are shown by input/outputs 325, 335, and 345 of FIG. 3. The process performs an action on received jobs that creates completed jobs. Completed jobs do not need to be passed on to another process for subsequent action. The completed jobs may be sent back to the originating source and/or some other destination. Determination at block 610 may include counting the number of completed jobs, or determining a rate of the number of completed jobs where the rate is based on the common time period. Counters 360, 370, and 380 of FIG. 3 show counting of completed jobs.

At block 615, a determination is made as to jobs passed on by the process. For example, passed on jobs by a process are shown by input/outputs 330, 340, and 350 of FIG. 3. In certain cases, when jobs are received by the process no action is performed on the jobs and they are passed on to a succeeding process for action to be performed. In other cases, jobs may be received, an action performed, and the jobs are sent to a succeeding process for further action. Determination at block 615 may include counting the number of jobs that are passed, or determining the rate of the number of jobs passed where the rate is based on the common time period. Counters 365, 375, and 385 show counting of passed on jobs.

At block 620, a decision is made as to whether the jobs received (sent to the process) are greater than a threshold amount and the sum of the jobs completed and the jobs passed on. The threshold value is set that allows an acceptable difference between jobs received and jobs completed and passed on (jobs processed). A determination is made if the number of jobs completed and passed on is sufficient for the number of jobs received by the process, and accounting for the threshold value. If the amount of jobs received (sent to the process) does not exceed the threshold value and the amount of jobs completed and passed (i.e., following the "NO" branch of block 620), the process likely is not experiencing any problems and monitoring of jobs into and out of the process continues. If the number of amount of jobs received (sent to the process) exceeds the amount of jobs that are completed and passed (i.e., following the "YES" branch of block 620), the process may be experiencing a problem such as a hang.

At block 625, a decision is made if a predetermined amount of time for the jobs sent to the process has been exceeded. A predetermined or common time period is used to compare the number of jobs received with the number of jobs completed and passed on by the process. Jobs that are sent to (received by) the process are expected to be completed over the predetermined amount of time. As measured from the time the jobs are sent, if the common time period has not been exceeded, the process has additional time remaining to complete the jobs although jobs sent may be greater the sum of the jobs completed and passed on. If the common time period has not been exceeded, monitoring of jobs sent, jobs completed, and jobs passed continues (i.e., following the "NO" branch of block 625).

If the common time period for the job flow has been exceeded (i.e., following the "YES" branch of block 625), at block 630, a decision is made if any known non-hang conditions exist that may affect job flow. In the case of an array controller of a RAID or other storage device, such a condition may exist if the disk(s) or disk array has been removed from the storage device.

If it is determined that a non-hang condition exists (i.e., following the "YES" branch of block 630), at block 635 a corrective action is performed to address the non-hang condition that affects job flow. For the example of disks that have been removed in a storage device, corrective action may be to reinstall the disks and begin the job over.

If all possible known non-hang conditions have been looked at (i.e., following the "NO" branch of block 630) a corrective action is performed to correct a possible hang. In other words, a determination has been made that the sum of the number of jobs completed and passed on versus the number of jobs received is not acceptable, particularly over a given time period. The corrective action may be to perform a reset of the process, and either request for the remaining jobs to be completed or to request that the all the jobs be resent.

In certain cases, when job logs such as job log 282 are used to track jobs that are received at the input of the process and jobs that are sent from the output of the processes, job logs may be looked at to determine a job or jobs that potentially caused the hang.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A storage device comprising:
   a controller configured to receive jobs from a source;
   a set of components that receive, complete, and pass on jobs; and
   job flow analysis devices configured to the controller to track the number of jobs received, completed, and passed on by each component, wherein the controller compares the number of jobs received with a sum of the number of jobs completed and passed on by each component.

2. The storage device of claim 1 wherein the controller is further configured to perform a corrective action on the storage device and request from the source the jobs when the number of jobs received is greater than a sum of a threshold amount plus the number of jobs completed and passed on by one of the components.

3. The storage device of claim 1 wherein the set of components are arranged serially.

4. The storage device of claim 1 wherein the job flow analysis devices are comprised of job logs to record jobs received, completed, and passed on.

5. A storage device comprising:
a series of processes configured to count jobs received, completed, and passed on by each process;
a set of counters to track numbers of jobs received, completed, and passed on by each process in the series of processes; and
a controller that compares from the counters the number of jobs received versus the sum of the number of jobs completed and passed on by each process.

6. The storage device of claim 5 wherein the set of counters are comprised of job logs to record particular jobs received, completed, and passed on at each counter.

7. The storage device of claim 5 wherein the jobs are received from a device which communicates with the storage device.

8. The storage device of claim 5 wherein the controller tracks conditions that affect job flow other than input and output to the processes and performing corrective action.

9. A system that comprises the storage device of claim 5.

10. A storage device comprising:
means for counting a number of jobs received, completed, and passed on by processes in a controller of the storage device;
means for determining if a number of jobs completed and passed on is sufficient for a number of jobs received by each process;
means for resetting the processes; and
means for requesting for the jobs to be resent to the processes.

11. The storage device of claim 10 wherein the means for counting comprises a job log for jobs received, completed, and passed on by each process.

12. The storage device of claim 10 wherein the means for counting is performed by bandwidth analysis for jobs inputted to, and completed and passed on as output by each process.

13. A method comprising:
determining a number of jobs received, completed, and passed on by a process;
comparing the number of jobs received by the process and a sum of the number of jobs completed and passed on by the process;
deciding whether the sum of a threshold amount and of the number of jobs completed and passed on is greater than the number of jobs received; and
performing a corrective action when the sum of the threshold amount and the number of jobs completed and passed on versus the number of jobs received is not acceptable.

14. The method of claim 13 wherein the comparing is performed over a common time period during which the numbers of jobs are received, completed, and passed on by the process.

15. The method of claim 13 wherein the determining is performed by a counter for the jobs received, a counter for the jobs completed, and a counter for the jobs passed on.

16. The method of claim 15 wherein the determining is further comprised of tracking the jobs in job logs included in the counters.

17. The method of claim 13 wherein the determining comprises performing a bandwidth analysis at an input where the jobs are received, at an output of where the jobs are completed, and at an output of where the jobs are passed on.

18. The method of claim 13 wherein the performing a corrective action comprises requesting for jobs to be resent from a source.

19. The method of claim 13 wherein the process is one of a set of serial processes that receive, complete, and pass on jobs.

20. The method of claim 13 further comprising accounting for any conditions that affect job flow other than input and output to the process and performing corrective action.

21. A processor-readable medium comprising processor-executable instructions for analyzing job flow in a process, the processor-executable instructions comprising instructions for:
tracking a number of jobs received, jobs completed, and jobs passed on by the process;
comparing the number of jobs received by the process with the number of jobs completed and passed on the process; and
determining a discrepancy whenever the number of jobs received by the process exceeds the number of jobs completed and passed on the process.

22. The processor-readable medium of claim 21 wherein the tracking is performed for an expected amount of time for which the jobs are to be completed.

23. The processor-readable medium of claim 21 wherein the process is part of a set of serial processes.

24. The processor-readable medium of claim 21 wherein the instructions further comprise performing a corrective action when the process when a discrepancy is determined.

25. The processor-readable medium of claim 24 further comprising requesting for a complete set of jobs to be received when performing the corrective action on the process.

26. The processor-readable medium of claim 24 further comprising requesting for jobs awaiting to be processed when the corrective action is performed.

* * * * *